(12) United States Patent
Langner et al.

(10) Patent No.: US 8,098,768 B2
(45) Date of Patent: Jan. 17, 2012

(54) COMPENSATION OF ETHERNET TRANSMIT BASELINE WANDER

(75) Inventors: Paul Langner, Fremont, CA (US); Hossein Sedarat, San Jose, CA (US); Tom Gandy, Palo Alto, CA (US)

(73) Assignee: Aquantia Corporation, Milpitas, CA (US)

( * ) Notice: Subject to any disclaimer, the term of this patent is extended or adjusted under 35 U.S.C. 154(b) by 526 days.

(21) Appl. No.: 12/369,702

(22) Filed: Feb. 11, 2009

(65) Prior Publication Data

US 2009/0202003 A1 Aug. 13, 2009

Related U.S. Application Data

(60) Provisional application No. 61/027,766, filed on Feb. 11, 2008.

(51) Int. Cl.
*H04L 25/06* (2006.01)
*H04L 25/10* (2006.01)

(52) U.S. Cl. ........ 375/319; 375/257; 375/258; 375/316; 375/317

(58) Field of Classification Search .......... 375/257, 375/258, 319, 316, 317
See application file for complete search history.

(56) References Cited

U.S. PATENT DOCUMENTS

| 5,818,378 A | * | 10/1998 | Cheng et al. | 341/155 |
| 6,408,032 B1 | | 6/2002 | Lye et al. | |
| 7,194,037 B1 | * | 3/2007 | Sutardja | 375/258 |
| 7,215,720 B2 | * | 5/2007 | Yeh | 375/317 |

FOREIGN PATENT DOCUMENTS

CA 2266534 7/2003

OTHER PUBLICATIONS

G. Zimmerman et al., Alternative Specification to OCL Inductance to Control 100BASE-TX Baseline Wander, Solarflare Communications, May 27, 2008, 10 pages.

* cited by examiner

*Primary Examiner* — Ted Wang
(74) *Attorney, Agent, or Firm* — Lance M. Kreisman, Esq.; Mahamedi Paradice Kreisman LLP

(57) ABSTRACT

Compensation of transmit baseline wander in data transmission on a network. In one aspect, compensating for baseline wander includes receiving a signal to be transmitted by a transmitter, where the transmitter is operable with a higher-speed transmission standard requiring magnetics a first open circuit inductance. The signal is processed to compensate for a transmit baseline wander in the signal, the transmit baseline wander associated with a lower-speed transmission standard that requires magnetics with a second open circuit inductance that is higher than the first open circuit inductance. The processed signal is to be provided for transmission on a twisted pair cable of the network.

24 Claims, 4 Drawing Sheets

COMPENSATION OF ETHERNET TRANSMIT BASELINE WANDER

CROSS REFERENCE TO RELATED APPLICATIONS

This application claims the benefit of U.S. Provisional Application No. 61/027,766, filed Feb. 11, 2008, and entitled, "100BASE-TX Ethernet, Transmit Baseline Wander Compensation Technique," which is incorporated herein by reference in its entirety.

FIELD OF THE INVENTION

The present invention relates generally to electronic communications, and more particularly to compensation of baseline wander in Ethernet transmission of data in networks using multiple standards.

BACKGROUND OF THE INVENTION

Ethernet standards are widely used in computer networks to communicate information between computers and other electronic devices. A common family of Ethernet standards are the standards for use over twisted-pair cables, including 10BASE-T (10 Mbit/sec), 100BASE-TX (100 Mbit/sec), 1000BASE-T (1000 Mbit/sec), and 10GBASE-T (10 Gbit/sec). In general, it is desired for the higher-speed standards to support the lower-speed standards, allowing older equipment to be used if necessary, and also allowing lower-speed network management standards to be used with higher-speed standards, such as "Wake on LAN" that allows a computer to be turned on or woken up remotely by a network message.

One problem with the more recent 10GBASE-T standard is that the magnetics of the transformers used in transmitters of this standard are not fully compatible with the magnetics of transformers used by earlier, lower-speed standards. For example, legacy 100BASE-TX ports are based on transformers having an inductance of 350 uH, but 10GBASE-T performance appears to demand an inductance in the 150 uH-200 uH range for improved high frequency return loss. This is a fundamental design issue, because lowering the inductance of the transformers tends to increase the baseline wander. Baseline wander is a gradual drifting of voltage in the average receive signal caused by unbalanced data sequences sent through transformers. The 100BASE-TX standard in particular creates baseline wander due to the particular encoding used (4B5B encoding), which is unbalanced. Thus, reducing the inductance from the earlier 350 uH for systems performing under the higher-speed 10GBASE-T standard will increase baseline wander when using the 100BASE-TX standard, possibly taking the network out of compatibility with the 100BASE-TX standard. This is an issue if both 10BASE-TX and 10GBASE-T standards are used in the same network system, e.g., if multi-rate 100/1G/10GBASE-T enabled physical layer interface integrated circuits (PHYs) at the transmission end need to inter-operate with legacy 100BASE-TX ports.

Some baseline wander compensation techniques have been used in prior systems. However, such techniques are not intended for use with the magnetics needed for higher speed standards such as 10GBASE-T. In addition, the additional dynamic range available to the digital-to-analog converter (DAC) and output driver in a 10GBASE-T transmitter can be severely limited due to constraints of silicon size and power consumption, which limits any baseline wander compensation technique.

Accordingly, what is needed is a system and method that addresses baseline wander when using higher-speed Ethernet magnetics with legacy Ethernet standards, and allows for a reduction in required dynamic range needed in the transmitter for a given level of compensation.

SUMMARY OF THE INVENTION

Compensation of transmit baseline wander is disclosed. In one aspect, a method for compensating for baseline wander in transmission of data over a network includes receiving a signal to be transmitted by a transmitter, where the transmitter is operable with a higher-speed transmission standard requiring magnetics with a first open circuit inductance. The signal is processed to compensate for a transmit baseline wander in the signal, the transmit baseline wander associated with a lower-speed transmission standard that requires magnetics with a second open circuit inductance that is higher than the first open circuit inductance. The processed signal is to be provided for transmission on a twisted pair cable of the network.

In another aspect, a transmission architecture for performing compensation of baseline wander in transmission of data over a network includes an adjustment block that receives a signal to be transmitted by a transmitter, the processing block providing an adjustment for the signal to compensate for a transmit baseline wander in the signal. The transmitter is operable with a higher-speed transmission standard requiring magnetics with a first open circuit inductance, and the transmit baseline wander is associated with a lower-speed transmission standard requiring magnetics with a second open circuit inductance that is higher than the first open circuit inductance. The architecture also includes an adder for adding the adjustment to the signal to obtain a resulting signal, wherein the resulting signal is to be provided for transmission on a twisted pair cable of the network.

The embodiments disclosed herein allow reduction of baseline wander in higher-speed Ethernet standards to allow operation of legacy Ethernet standards, providing both 100BASE-TX and 10GBASE-T performance in a multi-rate physical layer interface.

DETAILED DESCRIPTION OF PREFERRED EMBODIMENTS

The present invention relates generally to electronic communications, and more particularly to compensation of baseline wander in Ethernet transmission of data in networks using multiple standards. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The described embodiments allow the use of 10GBASE-T magnetics with multi-rate 100/1G/10GBASE-T enabled Physical Layer IC's (PHY's) enabled to inter-operate with Legacy 100BASE-TX ports during a maximum Baseline Wander Event. The embodiments also reduce the dynamic range requirements of baseline wander compensation. The dynamic range available to the D/A and output driver is typically severely limited, since greater dynamic range increases silicon size and power consumption, and thus this factor has to be taken into consideration in a baseline wander compensation technique.

Figure 1:
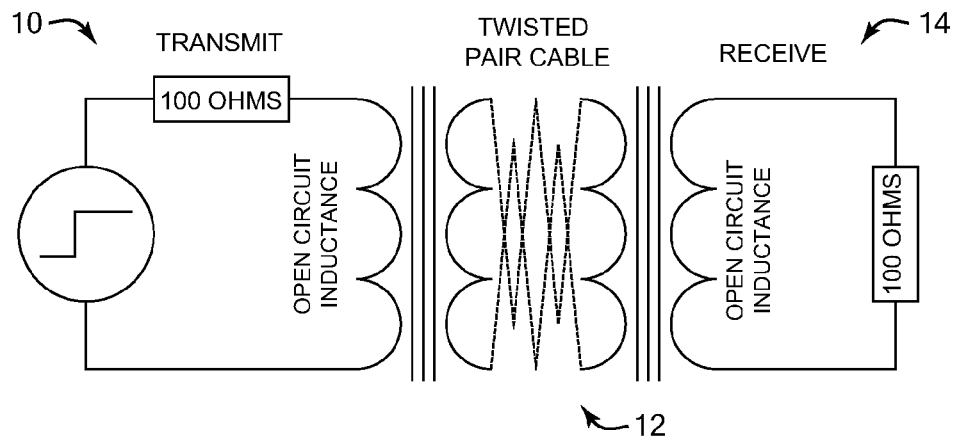
FIG. 1 is a schematic diagram illustrating a transmitter end, a twisted pair cable, and a receiver end for an Ethernet network.

FIG. 1 is a schematic diagram illustrating a transmitter end 10, a twisted pair cable 12, and a receiver end 14 for an Ethernet network. As is well known, transformers at the transmitter end and the receiver end each provide an open circuit inductance, indicated by the inductor symbols in FIG. 1.

Figure 2A:
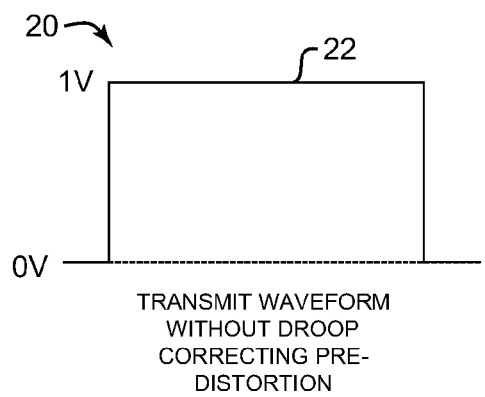
FIGS. 2A-2D are graphs illustrating signals transmitted from a transmitter over an Ethernet network under a standard having baseline wander.
Figure 2B:
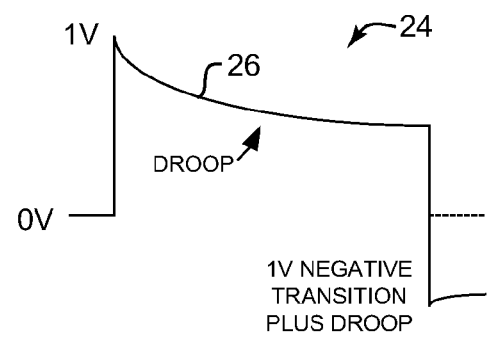

FIGS. 2A-2D are graphs illustrating signals transmitted from a transmitter over an Ethernet network under a standard having baseline wander, such as the 100BASE-TX standard. A signal provided for the 100BASE-TX Ethernet standard will be 4B5B encoded, and is combined with MLT-3 line coding. There is a DC component in the signal since 4B5B encoding combined with MLT-3 line coding is not DC balanced. Sending a DC component through a transformer-isolated system (as shown in FIG. 1) causes droop and thus baseline wander. This is shown by FIGS. 2A and 2B, wherein graph 20 of FIG. 2A the regular waveform 22 is transmitted, resulting in a waveform 26 as shown in graph 24 of FIG. 2B which includes droop after being sent through the transformers of the transmitter.

Figure 2C:
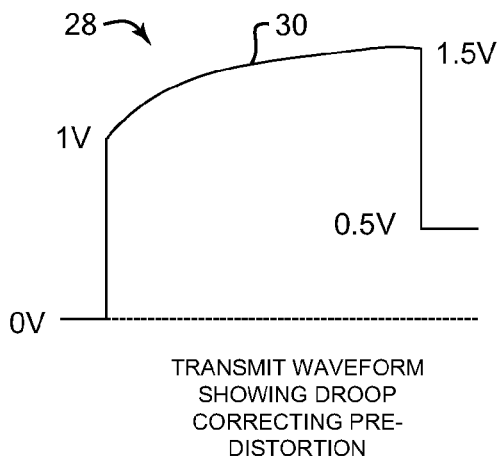
Figure 2D:
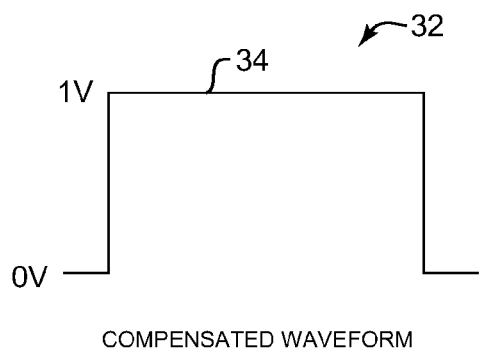

Baseline wander can be reduced through transmit pre-distortion, in which the waveform is pre-distorted to correct for the droop. The graph 28 of FIG. 2C shows a waveform 30 including droop-correcting pre-distortion, which after transmission appears as waveform 34 as shown in graph 36 of FIG. 2D. However, resulting waveform 34 is an ideal waveform, including full compensation of the droop. The pre-distortion necessary to create this resulting waveform requires a large increase in dynamic range in a D/A converter and output driver of the transmitter, and that dynamic range may not be available.

Figure 3:
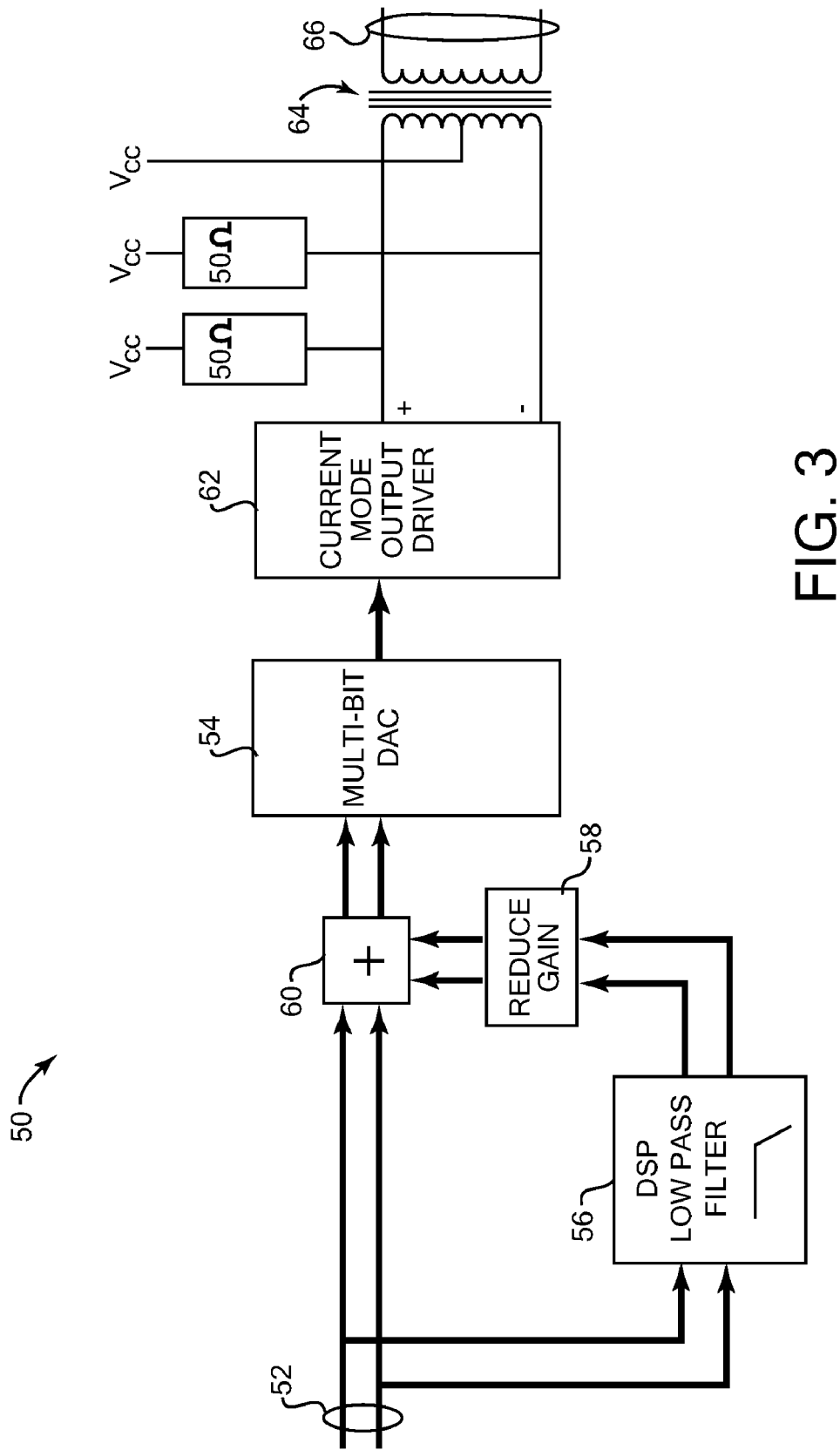
FIG. 3 is a block diagram illustrating a first embodiment of the present invention for a transmitter portion of a transmitter that can be used in an Ethernet network and providing transmit baseline wander correction.

FIG. 3 is a block diagram illustrating a first embodiment of the present invention for a transmitter portion 50 of a transmitter that can be used in an Ethernet network and providing transmit baseline wander correction. Transmitter portion 50 transmits data to one or more receivers that are connected to the transmitter via the network. Previous portions of the transmitter which provide and process the data to be sent are not shown in FIG. 3.

Data to be transmitted arrives on a data bus 52, which is a high resolution, multi-bit representation of an Multi-Level Transmit (MLT-3) line signal. As is well known, the data for the 100BASE-TX standard is processed by 4B5B binary encoding, further encoding, and has finally been encoded using an MLT-3 line code to eventually provide three voltage levels for the data on the twisted pair. The described embodiments use a multi-bit representation of the line signal, and a higher resolution, multi-bit D/A system. This multi-bit, higher resolution is not required to generate the relatively simple, lower-resolution three-level code of MLT-3 which is used in 100BASE-TX, but is used here due to the requirements when using the higher-speed standard (10GBASE-T). The presently described embodiment provides a baseline wander correction approach for 100BASE-TX to be based on the signal flow architecture for a 10 Gigabit PHY (e.g., higher-resolution, multi-bit components such as D/A converter, multi-bit adder, and DSP functionality), and thus the transmitter portion 10 functions with a multi-rate 100/1G/10GBASE-T PHY.

The multi-bit representation of the MLT-3 line code is sent towards an output digital-to-analog (D/A) converter 54 and also to a low pass filter 56, which in the embodiment of FIG. 3 is shown as a digital signal processing (DSP) low pass filter 56. The digital low pass filter 56 strips off a DC component of the signal that is going to be sent to the twisted pair line of the network. There is a DC component in the signal since 4B5B encoding combined with MLT-3 line coding (as used in 100BASE-TX) is not DC balanced.

Low pass filter 56 filters the data according to a desired corner frequency, which has been determined to provide baseline wander compensation. It would appear that the corner frequency of the low pass filter should match the corn/r frequency set by the L/R (inductance/resistance) of the inductance of the isolation transformer and 100 Ohms of the line resistance. This is a good starting point. However, the corner of the DSP low pass filter can be manipulated for better efficient use of dynamic range in the D/A converter and output driver, as described in greater detail below.

After the low pass filter 56, the resulting signal is preferably provided to a gain reduction block 58. The present embodiment preferably uses gain reduction block 58 to divide down the gain of the output of the low pass filter 56. The block 58 provides the reduced signal to a multi-bit adder 60 which adds the reduced signal to the high resolution data stream of signal 52, and the summed signal is provided to the D/A converter 54. The gain reduction provides a less-perfect baseline wander compensation, as a tradeoff for a reduced dynamic range requirement in the D/A converter 54 and output driver.

Alternatively, the signal output from the low pass filter 56 could be provided directly to adder 60, added to the data stream of signal 52, and provided to the D/A converter 54. However, this could double the dynamic range requirement of the D/A converter 54. Increased dynamic range is a precious commodity in a higher-resolution, higher-speed D/A converter and output driver than required for 100BASE-TX, which is needed for the 10GBASE-T standard. For example, increasing the dynamic range requires more silicon size and power consumption. Additionally, since the line signal flows through a transformer, the longer a DC imbalance lasts, the more droop that occurs and the more dynamic range that is required for compensation; a pure DC signal would require infinite dynamic range. Thus providing the gain reduction block 58 is more desirable in the described applications.

The D/A converter 54 converts the signal to an analog signal and provides it to a current mode output driver 62, which outputs the signal through the transformer 64 and to the twisted pair line 66. In the present example, the D/A converter 54, output driver 62, adder 60 are part of a signal flow architecture optimized for the 10GBASE-T standard, e.g., higher resolution and multi-bit architecture, higher frequency operation, and a lower open loop inductance for the transformer 64 (such as 230 uH), as needed for the faster standard.

The corner frequency of the low pass filter 56 and the gain reduction of the block 58 can be determined to provide increased efficiency for the multi-standard applications described herein (e.g., operation under both 10GBASE-T and 100BASE-TX). In the present embodiment the requirements of the Ethernet standard are used to optimize baseline wander.

A Baseline Wander Event is an event during network transmission of data in which baseline wander has occurred. The time window of interest for compensation of a Baseline Wander Event for 100BASE-TX can be derived directly from the American National Standards Institute (ANSI) Fibre Distributed Data Interface (FDDI), Token Ring Twisted Pair Physical Layer Medium Dependent (TP-PMD) standard (ANSI X3.263: 1995). This time window represents the point to set the gain 58 and corner frequency of the DSP low pass filter 56 for optimum use of available dynamic range in the above-described embodiment. In this example, the time window of interest in a maximal Baseline Wander Event is 1213 Bit Times with 8 nsec per Bit Time (where Bit Time is the timing between bit transitions or edges).

The present invention thus recognizes that the used standard, such as the ANSI TP-PMD upon which 100BASE-TX is based, provides the answer to the bounds of the baseline wander process time window and thus provides a point to optimize the filter coefficients of low pass filter 56 and the gain 58 (or the integrator size in the embodiment of FIG. 5) for best use of dynamic range. For example, Appendix A2 of TP-PMD defines a "DDJ Test Pattern for Baseline Wander Measurements." The resistance is specified at 50 Ohms (transmit resistance of 100 Ohms in parallel with the 100 Ohm test load). Additionally, the inductance is specified (350 uH) and the droop is specified (750 mV Baseline Wander or 0.25 droop). The only unknown variable left in the droop equation is time, as indicated in the equation below:

$$\text{Droop} = e^{-(R/L)t}$$

Therefore there is an effective droop time of a "killer packet" baseline wander event, where the killer packet provides the maximum baseline wander. This works out to 1213 Bit Times of 8 nsec each (9.704 usec). This is the bounded, process, time window of interest.

In the described architecture, decisions are made and corrections applied on a 8 nsec, Bit Time by Bit Time basis at high resolution. Baseline Wander Events are a low frequency event, e.g., with a time window of 1213 Bit Times, about 9.7 usec, which is 103 kHz. Instead of waiting a number of Bit Times before correcting the baseline wander (as in some previous implementations), the embodiments herein use the high resolution of the 10GBASE-T standard to correct 100BASE-TX baseline wander. This results in baseline wander corrections that are incremental and tiny, due to the higher resolution. A side effect of this is that the spirit of ANSI TP-PMD clause 9.1.4 "Signal Amplitude Symmetry" is met. This clause requires that a high transition match a low transition within 2% voltage. This is easily met with the high resolution multi-bit architecture used herein, required for 10 Gigabit transmissions, since correction is occurring much faster than required by the baseline wander event frequency.

One example follows of determining the corner frequency for the low pass filter 56 and the gain of the block 58 for a given set of conditions, given below.

Assume a 3 dB increase in the dynamic range of D/A converter 54 and the output stage. This represents an increase of 41.25%.

Assume magnetics with a 230 uH OCL (Open Circuit Inductance). Commercially available 200 uH magnetics may have design centers around 290 uH.

Assume a goal of achieving a droop of 0.25 at 1213 Bit Times. This would match the performance of legacy 100 BASE-TX ports using 350 uH magnetics.

Assume a divider ratio of two at the output of the DSP low pass filter 56.

Assume the time window of interest is 1213 BT (8 nsec per Bit Time)

Set the corner frequency of the filter 56 for optimum use of dynamic range. The step response of a single pole Low Pass Filter is:

$$1 - e^{-(t/RC)}$$

where t is time and RC is the time constant. For the one volt signal swing (+/−) of 100BASE-TX, a 3 dB increase in dynamic range means a new dynamic range of 1.4125 V, or a dynamic range increase of 0.4125 V is available.

The divider at the output of the DSP Low Pass is two so there is 0.8250 V of correction voltage available at the output of the DSP filter at 1213 BT, if the dynamic range of the system is not to be exceeded.

The factors above are plugged into the equation:

$$0.8250 = 1 - e^{-(t/RC)}$$

where t=1213 BT*8 nsec/BT.

The resulting RC time constant is 5.5675 usec (the time constant is in the DSP low pass filter, not resistance and capacitance).

Table 1, below, shows the bit time, droop, total correction, incremental correction, and corrected droop for several different bit times, using the example parameters above. "Droop" is the droop of the magnetics before correction is applied. "Total Correction" is output of the low pass filter 56 divided by two. "Incremental Correction" is the additional correction applied during the time period; for example, 0.0322 at 100 BT is the amount of incremental correction added to the total during the time between 50 BT and 100 BT. "Corrected Droop" is the actual droop with correction applied. The data table uses 50 BT or 100 BT increments for compactness of presentation; the table can also be shown with 1 BT increments to more finely show how the compensation is spread over time.

TABLE 1

| Bit Time | Droop | Total Correction | Incremental Correction | Corrected Droop |
| --- | --- | --- | --- | --- |
| 50 | 0.9167 | 0.0347 |  | 0.9514 |
| 100 | 0.8722 | 0.0669 | 0.0322 | 0.9044 |
| 150 | 0.8291 | 0.0970 | 0.0301 | 0.8592 |
| 200 | 0.7876 | 0.1249 | 0.0279 | 0.8155 |
| 300 | 0.6853 | 0.1751 | 0.0502 | 0.7355 |
| 400 | 0.6181 | 0.2186 | 0.0435 | 0.6616 |
| 500 | 0.5560 | 0.2563 | 0.0377 | 0.5937 |
| 600 | 0.4989 | 0.2889 | 0.0326 | 0.5315 |
| 700 | 0.4467 | 0.3172 | 0.0283 | 0.4750 |
| 800 | 0.3992 | 0.3416 | 0.0244 | 0.4236 |
| 900 | 0.3559 | 0.3628 | 0.0212 | 0.3771 |
| 1000 | 0.3169 | 0.3812 | 0.0184 | 0.3353 |
| 1100 | 0.2818 | 0.3971 | 0.0159 | 0.2977 |
| 1200 | 0.2502 | 0.4109 | 0.0138 | 0.2640 |

The droop is 0.2640 at 1200 BT, which meets the goal of 0.25 droop at 1213 BT. This matches the droop character and thus, provides compatibility with worst case baseline wander performance of legacy 100BASE-TX ports.

It should be noted that this analysis is based only on the 1 V positive swing of 100BASE-TX. The analysis is just as applicable to the −1 V negative swing.

Figure 4:
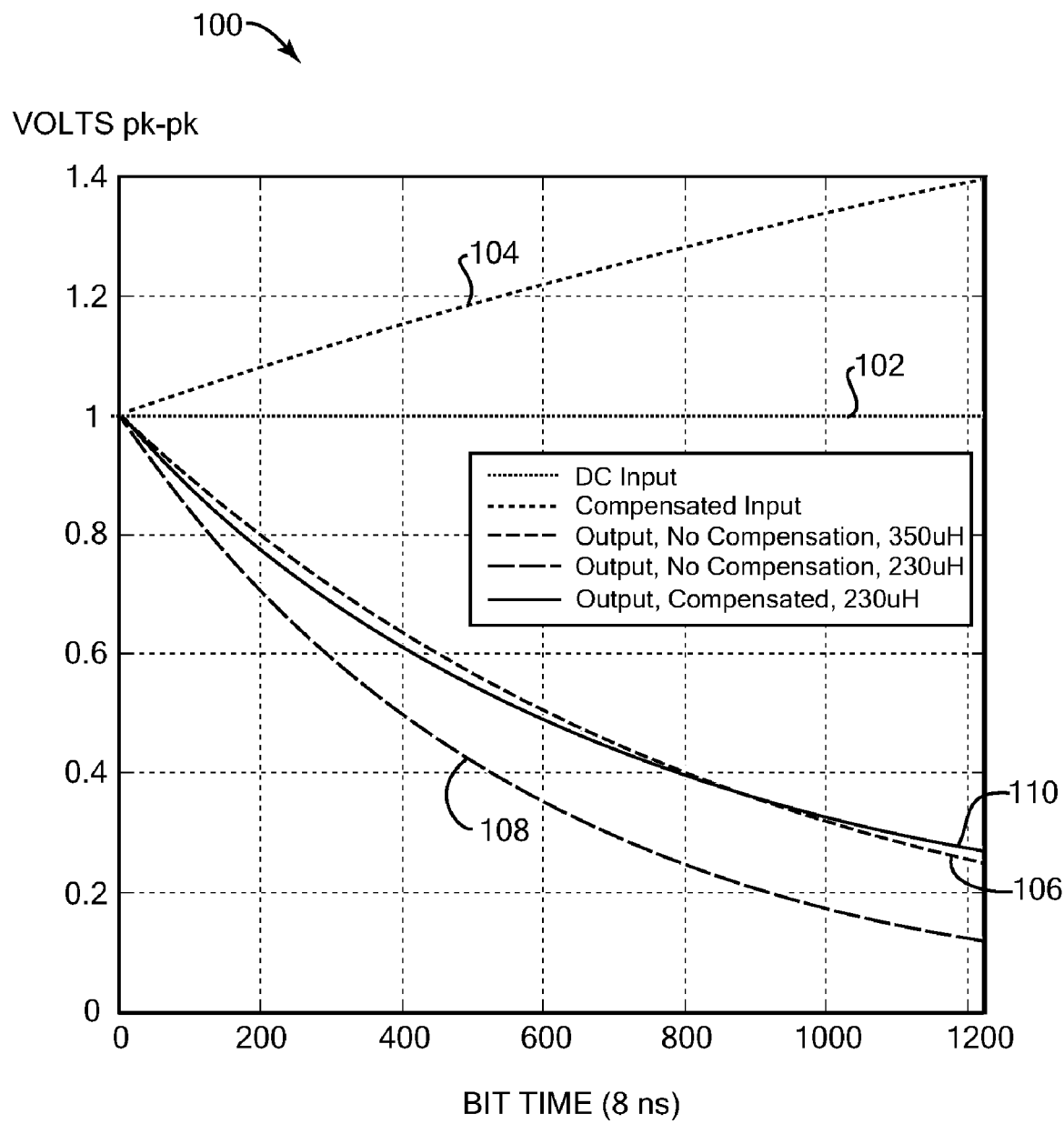
FIG. 4 is a graph illustrating various inputs and outputs for the transmitter of systems having compensated and uncompensated baseline wander.

FIG. 4 is a graph 100 illustrating various inputs and outputs for the transmitter of systems having compensated and uncompensated baseline wander, in accordance with the example and analysis described above. A DC input signal 102 is shown as a horizontal line. An input signal 104 to the transformer from the transmitter has been compensated according to the present embodiments to account for baseline wander, and thus has a greater amplitude than the DC input 102.

An uncompensated output signal 106 (output onto the twisted pair line) is shown for a legacy 100BASE-TX system, in which 350 uH of transformer inductance is present. An uncompensated output signal 108 is shown for a system using 230 uH of inductance, such that greater baseline wander results. A signal 110 has been compensated according to the embodiments described herein as explained in the example above, and when used with 230 uH of inductance shows that its baseline wander (droop) still approximately matches the baseline wander of 350 uH inductance of 100BASE-TX. Thus the compensation provided by the present invention allows a 230 uH transformer to be used as needed for a 10GBASE-T network, with a low enough baseline wander under 100BASE-TX signal processing to be compatible with 100BASE-TX systems.

Figure 5:
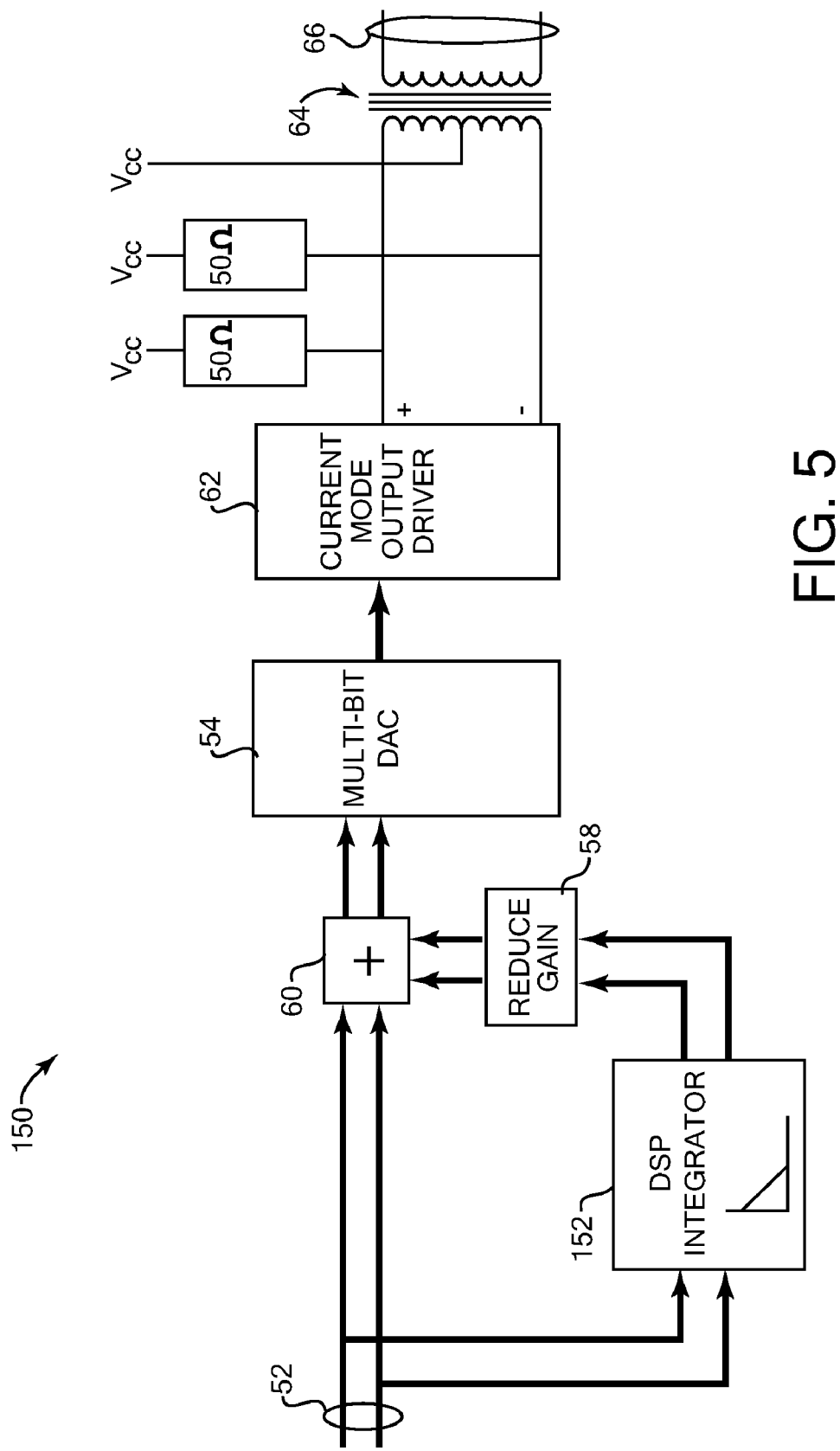
FIG. 5 is a block diagram illustrating a second embodiment of the present invention for a transmitter portion of a transmitter that can be used in an Ethernet network and providing transmit baseline wander correction.

FIG. 5 is a block diagram illustrating a second embodiment of the present invention for a transmitter portion 150 of a transmitter that can be used in an Ethernet network. Transmitter portion 150 is similar to transmitter portion 50 as described with reference to FIG. 3, except that portion 150 uses an integrator 152 or accumulator in place of the low pass filter 56, for example a DSP integrator 152. The integrator 152 provides a similar function to that of filter 56, to provide pre-distortion in the signal to compensate for droop resulting from the transformers in the transmitter. For example, a low pass filter is flat in frequency response at the low frequencies down to DC and rolls off the high frequencies, starting at a corner. The integrator 152 is the special case of a low pass filter where the corner frequency is DC.

In this integrator embodiment, the time window is used to set the size of the accumulator which forms the DSP integrator. The gain block 58 can be provided after the integrator 154 to reduce the needed additional dynamic range and for optimization of the amount of baseline wander compensation vs. output stage headroom, similarly as in the embodiment of FIG. 3.

In operation, this embodiment also processes in small increments, e.g., decisions are made and corrections applied on, for example, a 8 nsec, Bit Time by Bit Time basis at high resolution, conforming to ANSI TP-PMD signal amplitude symmetry similar to the embodiment of FIG. 3. This embodiment also uses other features similarly to FIG. 3, including the time window described above, and the higher-resolution multi-bit 10 Gigabit architecture that processes the low speed signal of the 100BASE-TX standard.

The embodiments of the present invention resolve the fundamental conflict between the design needs of magnetics for 10GBASE-T and the requirements of 100BASE-TX. The embodiments disclosed herein take a PHY architecture optimized for 10GBASE-T and adds transmit baseline wander compensation so that 10GBASE-T magnetics with the required specification (lower open circuit inductance, etc.), can be used with 100/1G/10GBASE-T multi-rate PHYs and inter-operate with legacy 100BASE-TX ports. This is one of the key design points for operation of 10G/1G/100BASE-TX multi-rate PHYs.

These embodiments perform 100BASE-TX transmit baseline wander correction while using a signal flow architecture optimized for 10GBASE-T operation (i.e. a multi-rate PHY). As signal flow architecture having a high number of bits needed for 10GBASE-T is used to process low resolution MLT-3 signals, in either the DSP low pass filter embodiment of FIG. 3 or the DSP integrator embodiment of FIG. 5. A gain block is used after the filter or integrator so that it is possible to modify the output of the DSP low pass filter and provide less ideal baseline wander compensation as a tradeoff for a reduced dynamic range requirement. Furthermore, decisions are made and corrections applied on a 8 nsec, Bit Time by Bit Time, basis at high resolution; the corrections are incremental and small. Thus the spirit of the ANSI TP-PMD clause 9.1.4 "Signal Amplitude Symmetry" is met.

Although the present invention has been described in accordance with the embodiments shown, one of ordinary skill in the art will readily recognize that there could be variations to the embodiments and those variations would be within the spirit and scope of the present invention. For example, other network standards can be used with the embodiments shown where similar requirements are applicable. Accordingly, many modifications may be made by one of ordinary skill in the art without departing from the spirit and scope of the appended claims.

What is claimed is:

1. A method for compensating for baseline wander in transmission of data over a network, the method comprising:
   receiving a signal to be transmitted by a transmitter, wherein the transmitter is operable with a higher-speed transmission standard requiring magnetics with a first open circuit inductance; and
   processing the signal to compensate for a transmit baseline wander in the signal, the transmit baseline wander associated with a lower-speed transmission standard that requires magnetics with a second open circuit inductance that is higher than the first open circuit inductance, wherein the processed signal is to be provided for transmission on a twisted pair cable of the network.

2. The method of claim 1 wherein the baseline wander compensation includes distorting the signal to provide correction of droop that occurs in the signal when transmitted to the twisted pair cable using the lower-speed transmission standard.

3. The method of claim 1 wherein the processing of the signal includes low pass filtering the signal and adding the filtered signal to the signal.

4. The method of claim 3 wherein the processing the signal includes providing a gain reduction to the signal after the low pass filtering to reduce a dynamic range required by a digital-to-analog converter and output driver that receives the signal and outputs the signal on the twisted pair cable.

5. The method of claim 1 wherein the processing includes providing the signal to an integrator and adding the output of the integrator to the signal.

6. The method of claim 5 wherein the processing the signal includes providing a gain reduction to the signal after the integrator to reduce a dynamic range required by a digital-to-analog converter and output driver that receives the signal and outputs the signal on the twisted pair cable.

7. The method of claim 1 wherein the baseline wander compensation includes using a time window for the compensation, the time window derived from the lower-speed transmission standard.

8. The method of claim 7, wherein the processing of the signal includes low pass filtering the signal and providing a gain reduction to the signal after the low pass filtering, wherein the time window is used in determining a corner frequency of the low pass filtering and a gain value of the gain reduction.

9. The method of claim 1 wherein the processing includes providing the signal to an integrator, wherein the time window is used in determining a size of an accumulator which forms the integrator.

10. The method of claim 1 wherein the processing includes using an architecture with a higher bit-resolution needed for the higher-speed transmission standard to process lower-resolution signals used by the lower-speed transmission standard.

11. The method of claim 10 wherein the baseline wander compensation is performed as incremental corrections on a bit time by bit time basis at the higher-bit resolution.

12. The method of claim 1 wherein the open circuit inductance is provided by a transformer, and wherein the higher-speed transmission standard is 10GBASE-T Ethernet and the lower-speed transmission standard is 100BASE-TX Ethernet.

13. A transmission architecture for performing compensation of baseline wander in transmission of data over a network, the architecture comprising:
   an adjustment block that receives a signal to be transmitted by a transmitter, the processing block providing an adjustment for the signal to compensate for a transmit baseline wander in the signal, wherein the transmitter is operable with a higher-speed transmission standard requiring magnetics with a first open circuit inductance, and the transmit baseline wander is associated with a lower-speed transmission standard requiring magnetics with a second open circuit inductance that is higher than the first open circuit inductance; and
   an adder for adding the adjustment to the signal to obtain a resulting signal, wherein the resulting signal is to be provided for transmission on a twisted pair cable of the network.

14. The architecture of claim 13 wherein the adjustment block distorts the signal to provide correction of droop that occurs in the signal when transmitted to the twisted pair cable using the lower-speed transmission standard.

15. The architecture of claim 13 wherein the adjustment block includes a low pass filter that filters filtering the signal.

16. The architecture of claim 15 wherein the adjustment block includes a gain reduction block that provides a gain reduction to the signal.

17. The architecture of claim 16 further comprising a digital-to-analog converter and an output driver that receive the signal and output the signal on the twisted pair cable, wherein the gain reduction reduces the adjustment of the signal to reduce a dynamic range required by the digital-to-analog converter and output driver.

18. The architecture of claim 13 wherein the adjustment block includes an integrator.

19. The architecture of claim 18 wherein the adjustment block includes a gain reduction block that provides a gain reduction to the signal after the integrator to reduce a dynamic range required by a digital-to-analog converter that receives the signal.

20. The architecture of claim 13 wherein the adjustment block uses a time window for the compensation, the time window derived from the lower-speed transmission standard.

21. The architecture of claim 20, wherein the adjustment block includes a low pass filter and a gain reduction block after the low pass filter, wherein the time window is used in determining a corner frequency of the low pass filter and a gain value of the gain reduction block.

22. The architecture of claim 13 wherein the adjustment block includes an integrator, wherein the time window is used in determining a size of an accumulator which forms the integrator.

23. The architecture of claim 13 wherein the adjustment block and the adder have a higher bit-resolution architecture needed for the higher-speed transmission standard to process lower-resolution signals used by the lower-speed transmission standard.

24. The architecture of claim 13 wherein the open circuit inductance is provided by a transformer, and wherein the higher-speed transmission standard is 10GBASE-T Ethernet and the lower-speed transmission standard is 100BASE-TX Ethernet.

* * * * *